United States Patent [19]
Williams et al.

[11] Patent Number: 5,768,220
[45] Date of Patent: Jun. 16, 1998

[54] MOTORLESS BIAS-FIELD DEVICE AND METHOD HAVING MAGNETIC COUPLING BETWEEN A MAGNETIC AND THE RECORDING ELEMENT FOR INVERTING THE MAGNETIC FIELD

[75] Inventors: Christopher C. Williams, Rochester; Edward P. Furlani, Lancaster; Charles E. Brugger, Rochester; Bijan Barzideh, Rush, all of N.Y.

[73] Assignee: Eastman Kodak Company, Rochester, N.Y.

[21] Appl. No.: 800,347

[22] Filed: Feb. 14, 1997

[51] Int. Cl.[6] ............................................ G11B 11/00
[52] U.S. Cl. .................... 369/13; 360/114; 428/694 ML
[58] Field of Search ........................ 369/13, 14, 15, 369/110, 59, 116, 124; 360/59, 114; 428/694 ML, 694 MM

[56] References Cited

U.S. PATENT DOCUMENTS

| | | | |
|---|---|---|---|
| 5,020,042 | 5/1991 | Fearnside et al. | 369/13 |
| 5,072,432 | 12/1991 | Tanaka | 369/13 |
| 5,291,345 | 3/1994 | Umeda et al. | 360/59 |
| 5,402,410 | 3/1995 | Yoshimura et al. | 369/275.1 |
| 5,570,329 | 10/1996 | Furlani | 369/13 |
| 5,637,411 | 6/1997 | Shimazaki et al. | 428/694 ML |

*Primary Examiner*—Ali Neyzari
*Attorney, Agent, or Firm*—Peyton C. Watkins

[57] ABSTRACT

A bias-field device for a magneto-optical system having a magneto-optical recording element which includes a conductive substrate and which moves through a magnetic field created by the bias-field device so that information is selectively recorded on or erased from the recording element, the device comprises: a rotatable magnet that rotates so that when the recording element rotates the conductive substrate creates a magnetic coupling with the magnet for causing the magnet to rotate; and an escapement mechanism that releases and latches the magnet for permitting the magnet to be selectively rotated.

9 Claims, 3 Drawing Sheets

MOTORLESS BIAS-FIELD DEVICE AND METHOD HAVING MAGNETIC COUPLING BETWEEN A MAGNETIC AND THE RECORDING ELEMENT FOR INVERTING THE MAGNETIC FIELD

FIELD OF THE INVENTION

The invention relates generally to the field of magneto-optic recording and erasing and, more particularly, to such recording and erasing utilizing a motorless bias-field device for selectively inverting a bias field for permitting such recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature. The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam.

During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction.

Various schemes have been proposed to achieve the magnetic field inversions required in switching between the record and erase modes of the magneto-optic recording process. In the disclosures of U.S. Pat. Nos. 5,020,042 and 5,291,345, for example, the field inversion apparatus consists of a magnetic field producing coil surrounding a cylindrical bipolar magnet. One pole of the magnet is placed adjacent the recording medium for inducing its particular magnetization to the recording medium, and when the coil is energized, the field that the coil creates imparts a torque to the magnet forcing it to rotate for causing the other pole of the magnet to be adjacent the recording medium.

Although the presently known and utilized device is satisfactory, it is not without drawbacks. The coils are not energy efficient because they consume a substantial amount of energy.

Consequently, a need exists in the construction and mode of operating the bias-field device.

SUMMARY OF THE INVENTION

The present invention is directed to overcoming one or more of the problems set forth above. Briefly summarized, according to one aspect of the present invention, the invention resides in a bias-field device for a magneto-optical system having a magneto-optical recording element which includes a conductive substrate and which moves through a magnetic field created by the bias-field device so that information is selectively recorded on or erased from the recording element, the device comprising: (a) a rotatable magnet that rotates so that when the recording element rotates the conductive substrate creates a magnetic coupling with the magnet for causing said magnet to rotate; and (b) an escapement mechanism that releases and latches said magnet for permitting said magnet to be selectively rotated.

It is an object of the present invention to provide a bias-field device for overcoming the above-described drawbacks.

It is also an object of the present invention to provide an energy efficient and motorless bias field device.

It is an advantage of the present invention to provide a cost efficient bias-field device.

It is a further advantage of the present invention to provide a bi-directional bias-field device for selectively inverting the magnetic bias field.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
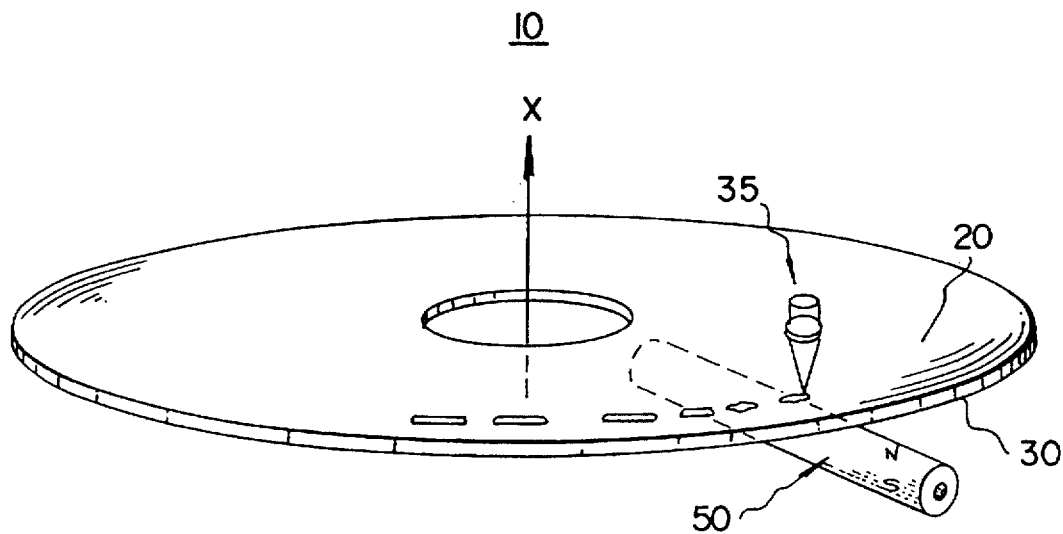
FIG. 1 is a perspective view of a portion of the bias field device of the present invention in the presence of a conductive media substrate.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. The supporting substrate is made of a conductive material, preferably aluminum. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device (only the magnet of which is shown in FIG. 1) includes a magnet 50 both having north and south poles oriented along their cross-sectional dimension, and is radially disposed with respect to the rotating disk 10 for providing a magnetic bias-field at recording layer 20. Although the preferred embodiment illustrates a magnet with one north and one south pole, the magnet may include a plurality of north and south poles. The magnet 50 is mounted for rotational movement, as will be described in detail below, so that the direction of the field under the desired location on the recording medium 10 may be switched from the downward direction in which one pole of magnet 50 (for example the north pole) is beneath the write/erase spot on recording layer 20 to an upward direction in which the magnet 50 is rotated so that south pole of magnet 50 is beneath the write/erase spot on recording layer 20. The reversal of poles of magnet 50 will cause magnetic domains in the recording element to flip orientations, e.g., from upward to downward, whenever the laser beam intensity is at its high level. In this manner, the digital information provided by the laser source 35 is magnetically recorded in the recording layer 20.

To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Figure 2:
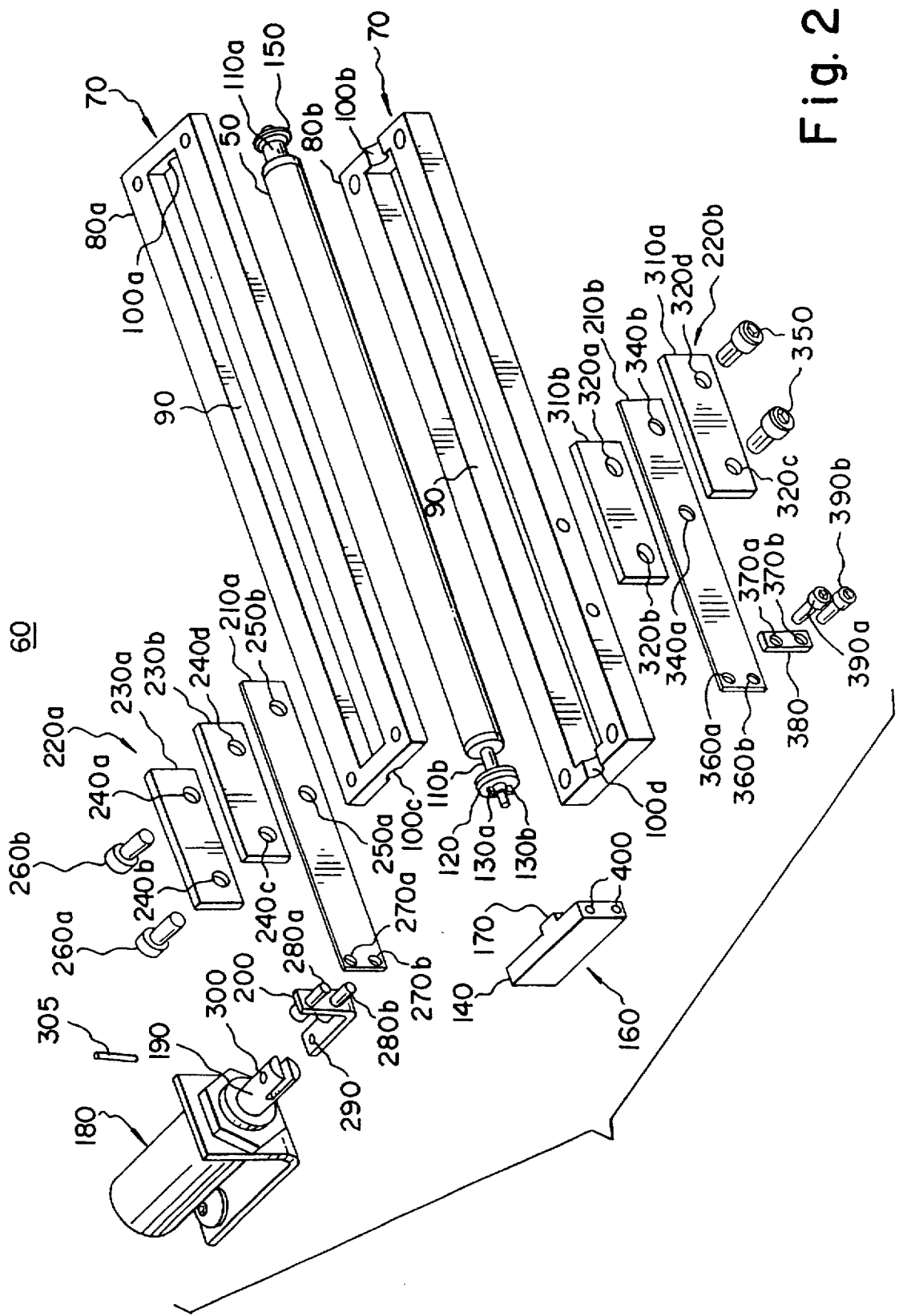
FIG. 2 is an exploded view of the bias-field device of the present invention illustrating its assembly.
Figure 3:
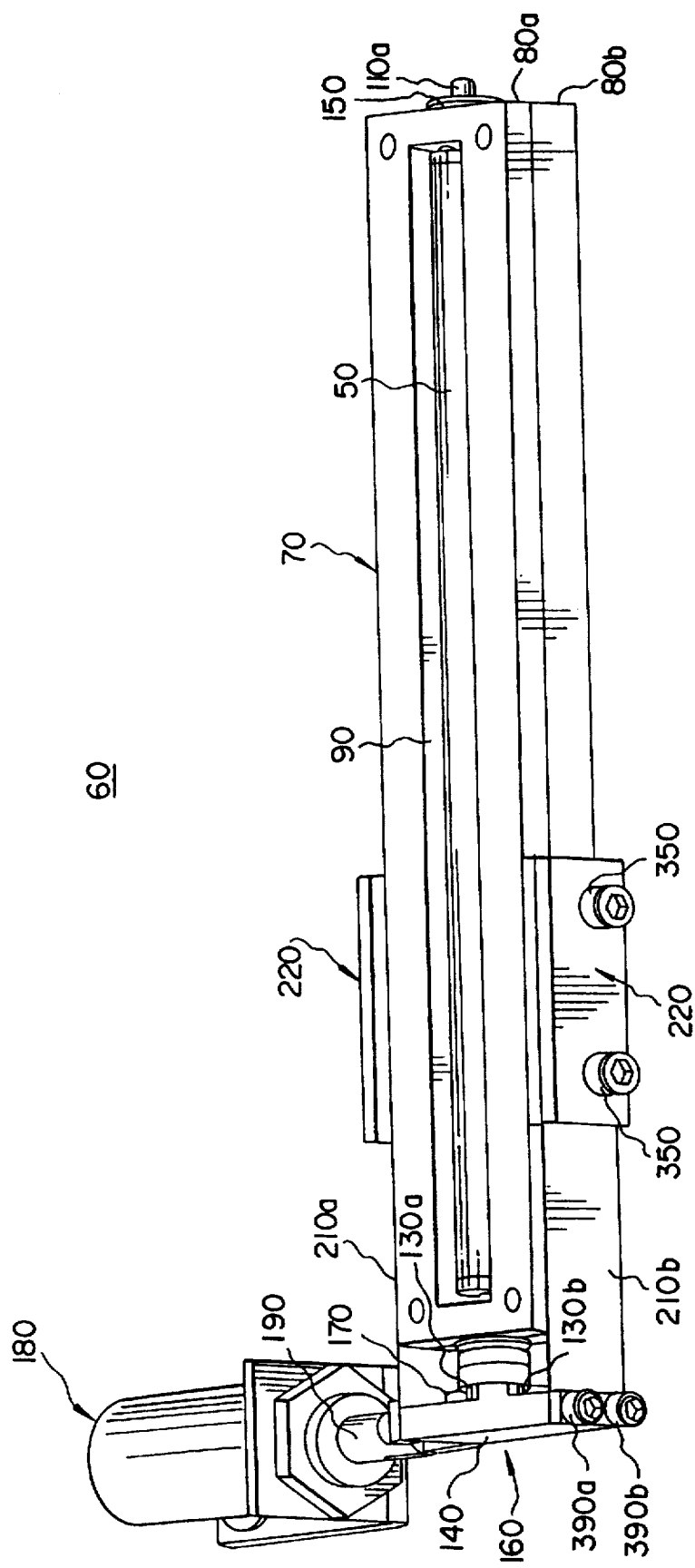
FIG. 3 is a perspective view of the bias-field device of the present invention.

Referring to FIGS. 2 and 3, there are illustrated two views of the bias field device 60 of the present invention. The bias field device 60 includes a housing 70 having two retaining members 80 each having a hollowed-out interior portion 90 for partially enclosing the magnet 50. Each retaining member 80 includes two semi circular-shaped, hollowed out portions 100 that each respectively align with a corresponding hollowed out portion 100 on the other retaining member 80 which, when aligned together, form a bore through which two necks 110 of the magnet 50 respectively extend. The neck 110b includes a disk 120 having two lip portions 130 extending therefrom, which lip portions 130 interact with a escapement plate 140, as will be described in detail hereinbelow. The other neck 110a includes a ring 150 which matingly fits against the exterior portion of an end of the housing 70.

An escapement mechanism 160 includes the plate 140 having three prongs 170 positioned on its interior portion against which the lip portions 130 rest for inhibiting rotation of the magnet 50, as will be discussed in detail below. A solenoid 180 is attached to the plate 140 and includes a movable shaft 190 which is retracted when it is energized with direct current by a current source (not shown). A bracket 200 is attached to the shaft 190 at one of its ends and to the plate 140 at its other for providing structural attachment between the solenoid 180 and plate 140. Two deformable springs 210 are respectively attached to a side of the housing 70 at one of their ends and to the plate 140 at their other end.

The springs 210 are respectively attached to the housing 70 via two attachments devices 220. One attachment device 220a includes two support members 230 which are placed abutting each other, and each support member 230 includes two holes 240 therethrough which are respectively in alignment with the holes (240a and 240d; 240b and 240c) in the other support member and in alignment with two holes 250 in the spring. The spring 210a is placed against the housing 70, and with the two support members 230a and 230b disposed on the other side of the spring 210a, a screw 260 is inserted into each triplicate set of aligned holes (240a, 240d, 250b aligned together; 240b, 240c, and 250a aligned together) for attaching the spring 210a to the housing 70. The spring 210a further includes two holes 270 at its other end into which two screws are inserted therethrough and eventually into a pair of holes (not shown) in the plate 140 for attaching the bracket 200 to the plate 140. The bracket 200 also includes a hole 290 which is in registry with a pair of holes 300 (only one of which is shown) in the shaft 190, and a pin 305 is placed into the aligned holes 300 and 290 for attaching the bracket 200 to the shaft 190.

The other attachment device 220b also includes two support plates 310 between which the spring 210b rests and the plates 310 and spring 210 also include a triplicate set of aligned holes (320b, 340a, 320c; 320a, 340b and 320d)as in the other attachment device. With plate 310b resting against the housing 70, a screw 350 is inserted into each triplicate set of aligned holes for attaching the spring 210b on the housing 70. The spring 210b also includes two holes 360 which are respectively in alignment with two holes 370 in a support structure 380, and a screw 390 is inserted into each pair of aligned holes (360a and 370a; 360b and 370b) for permitting each screw 390 to be respectively placed in a pair of holes 400 in the plate 140 for attaching the spring 210b to the plate 140.

Figure 4:
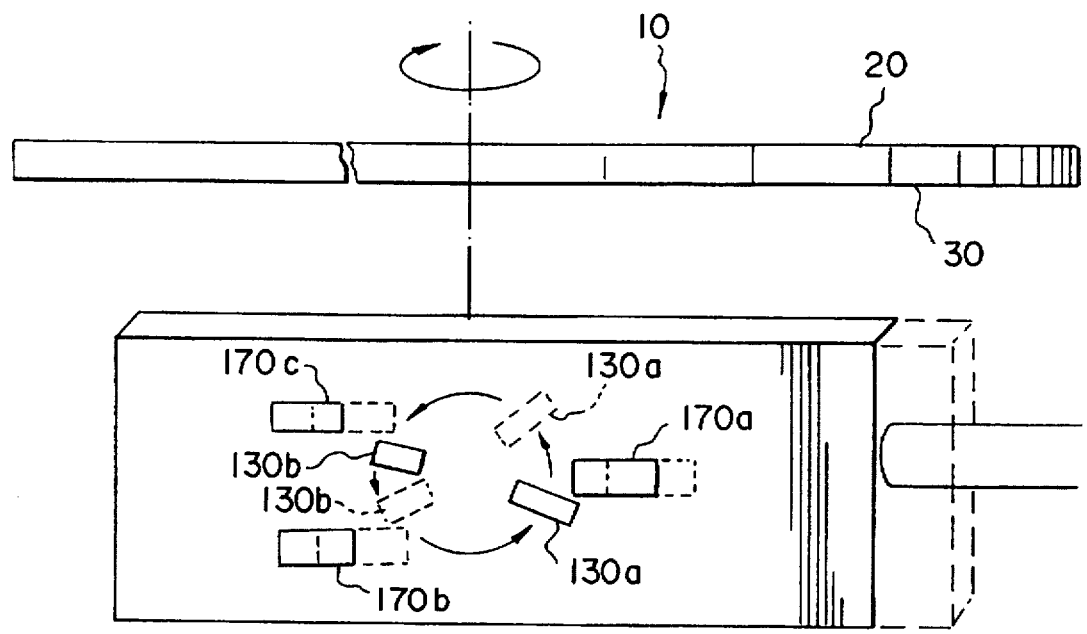
FIG. 4 is a side view of the escapement mechanism of the bias-field device.

Referring to FIGS. 3 and 4, there is illustrated the operation of the escapement mechanism 160. For purposes of illustration, the disk 10 is rotating in the direction illustrated by the arrow which causes the conductive substrate 30 to induce a force on the magnet 50 as illustrated by the arrows. When rotation of the magnet 50 is not desired, the shaft 190 of the solenoid 180 is fully extended outwardly so that the prong 170a contacts the lip portion 130a thereby prohibiting rotation, as illustrated by the lip portion 130a in solid lines. When rotation of the magnet 50 is desired, the solenoid 180 is energized so that the shaft 190 is retracted for permitting the lip portion 130a to rotate, as illustrated by the dashed lines. The opposite lip portion 130b rotates until it contacts the prong 170b, as also illustrated by the dashed lines. This permits control of rotation of the magnet 50 so that approximately one hundred eighty degree rotation of the magnet 50 is permitted and so that multiple rotations of the magnet 50 are eliminated. The solenoid 180 is then de-energized so that the prongs 170 return to their original position. This permits the lip portion 130b to rotate until it contacts the prong 170a so that it is disposed in the original position of lip portion 130a, and lip portion 130a rotates to the original position of lip portion 130b. The hereinabove described process permits the opposite polarity pole of the magnet 50 to be adjacent the disk. This process is repeated when the original polarity of the magnet 50 pole is desired to be adjacent the disk 10.

It is instructive to note that, when the disk 10 rotates in the opposite direction, the induced rotation on the magnet 50 is in the opposite direction from that illustrated by the arrows. In this case, the lip portion 130b is prohibited from rotation by the prong 170a, and the one hundred eighty degree rotation of the magnet is permitted by retracting the shaft 180, as discussed hereinabove. It is readily apparent to those skilled in the art that the interaction of the prongs 170 and lip portions 130 are in a different configuration from rotation in the opposite direction for prohibiting, permitting and controlling rotation of the magnet 50. It is instructive to note that the disk 120 may be divided into two distinct disks for the purposes of achieving precisely one hundred eighty degree rotation.

The preferred embodiment has been illustrated utilizing a two pole magnet. As those skilled in the art will recognize, if a plurality of poles are utilized, the quantity of lip portions 130 would be correspondingly increased according to the number of poles, and the rotation between positions would be correspondingly less than one hundred eighty degrees.

The invention has been described with reference to a preferred embodiment. However, it will be appreciated that variations and modifications can be effected by a person of ordinary skill in the art without departing from the scope of the invention.

Parts List 10 disk
20 recording layer
30 substrate
35 laser source
50 magnet
60 bias field device
70 housing
80 retaining members
90 interior portion
100 hollowed out portions
110 two necks
110a neck
110b neck
120 disk
130 lip portions
130a lip portion
130b lip portion
140 escapement plate
150 ring
160 escapement mechanism
170 prongs
170a prong
170b prong
180 solenoid
190 shaft
200 bracket
210 springs
210a spring
210b spring
220 attachment devices
220a attachment device
220b attachment device
230 support members
230a support members Parts List (cont'd)

230b support members
240 two holes
240a hole
240b holes
240c hole
240d hole
250 two holes
250a hole
250b hole
260 pin
270 two holes
280 screws
290 hole
300 pair of holes
305 pin
310 support plates
310b plate
320a hole
320b hole
320c hole
320d hole
340a hole
340b hole
350 screw
360 two holes
360a hole
36b hole
370 two holes
370a hole
370b hole
380 support structure
390 screw
400 pair of holes

What is claimed is:

1. A bias-field device for a magneto-optical system device comprising:

(a) a magneto-optical recording element having a conductive substrate and a recording layer which said recording element moves through a magnetic field created by the bias-field device so that information is selectively recorded on or erased from the recording element;

(b) a rotatable magnet that rotates so that when the recording element rotates the conductive substrate creates a magnetic coupling with the magnet for causing said magnet to rotate; and (c) an escapement mechanism that releases and latches said magnet for permitting said magnet to be selectively rotated.

2. The bias field device as in claim 1 further comprising means for actuating said escapement mechanism that causes said mechanism to release and latches said magnet.

3. The bias field device as in claim 2, wherein direction of rotation of said magnet is dependent on the direction of rotation of the recording element.

4. The bias field device as in claim 1, wherein said conductive substrate is a conductive metal.

5. The bias field device as in claim 4 further comprising a spring for assisting said escapement mechanism in releasing and latching said magnet.

6. The bias field device as in claim 4, wherein said escapement mechanism includes a plate having three prongs and said magnet includes two lip portions; wherein said lip portions and said prongs interact with each other so that predetermined rotation of the magnet is maintained.

7. A method for operating a bias-field device for a magneto-optical system, the method comprising the steps of:

(a) providing a magneto-optical recording element having both a conductive substrate and recording layer, which recording element moves through a magnetic field created by the bias-field device so that information is selectively recorded on or erased from the recording element;

(b) rotating a magnet about its longitudinal axis so that when the recording element rotates the conductive substrate creates a magnetic coupling with the magnet for causing said magnet to rotate; and (c) releasing and latching the magnet for permitting the magnet to be selectively rotated.

8. The method as in claim 7, wherein step (a) includes rotating the magnet in the direction of rotation of the conductive substrate.

9. The method as in claim 8, wherein step (b) includes releasing and latching the magnet by providing an escapement mechanism for assisting in the releasing and latching of the magnet.

* * * * *